United States Patent
Cuevas

[19]

[11] Patent Number: 6,131,948
[45] Date of Patent: Oct. 17, 2000

[54] AIR BAG INFLATOR WITH BURST DISK CUTTER AND FLOW CONTROL MEANS

[75] Inventor: Jess A. Cuevas, Scottsdale, Ariz.

[73] Assignee: TRW Inc., Lyndhurst, Ohio

[21] Appl. No.: 09/039,145

[22] Filed: Mar. 13, 1998

[51] Int. Cl.⁷ .................................................. B60R 21/26
[52] U.S. Cl. ........................................ 280/737; 137/68.19
[58] Field of Search ................................. 280/741, 742, 280/737; 137/68.21, 68.3, 68.19

[56] References Cited

U.S. PATENT DOCUMENTS

| | | |
|---|---|---|
| 3,744,816 | 7/1973 | Yamaguchi et al. . |
| 3,887,108 | 6/1975 | McDaniel et al. . |
| 5,195,777 | 3/1993 | Cuevas . |
| 5,257,817 | 11/1993 | Cuevas . |
| 5,590,906 | 1/1997 | Faigle et al. ............................ 280/741 |
| 5,601,309 | 2/1997 | Bender et al. ......................... 280/737 |
| 5,618,057 | 4/1997 | Johnson et al. ....................... 280/742 |
| 5,620,204 | 4/1997 | Frey ....................................... 280/737 |
| 5,649,720 | 7/1997 | Rink et al. ............................. 280/737 |
| 5,709,406 | 1/1998 | Buchanan .............................. 280/737 |

*Primary Examiner*—Paul N. Dickson
*Attorney, Agent, or Firm*—Tarolli, Sundheim, Covell, Tummino & Szabo L.L.P.

[57] ABSTRACT

An apparatus (10) for inflating an inflatable vehicle occupant protection device includes a container (18) defining a chamber (16) containing fluid (14) under pressure. The container (18) has a first opening (34). A frangible portion (40) of the container (18) covers the first opening (34) and blocks fluid flow from the chamber (16). The apparatus (10) includes a second opening (50), spaced apart from the first opening (34), through which fluid can flow from the first opening to the inflatable device to inflate the inflatable device. A cutter (90) is movable in a first direction for cutting the frangible portion (40) to release fluid to flow from the chamber (16) through the first opening (34) to the second opening (50). The cutter (90) is movable in a second direction opposite the first direction for allowing an increasing flow of fluid through the second opening (50) as the cutter moves in the second direction.

5 Claims, 4 Drawing Sheets

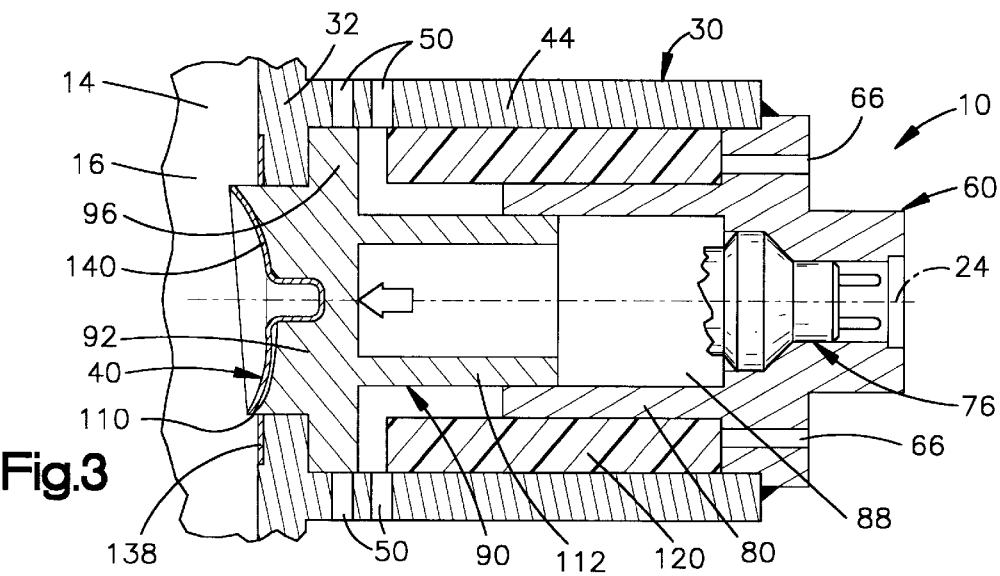
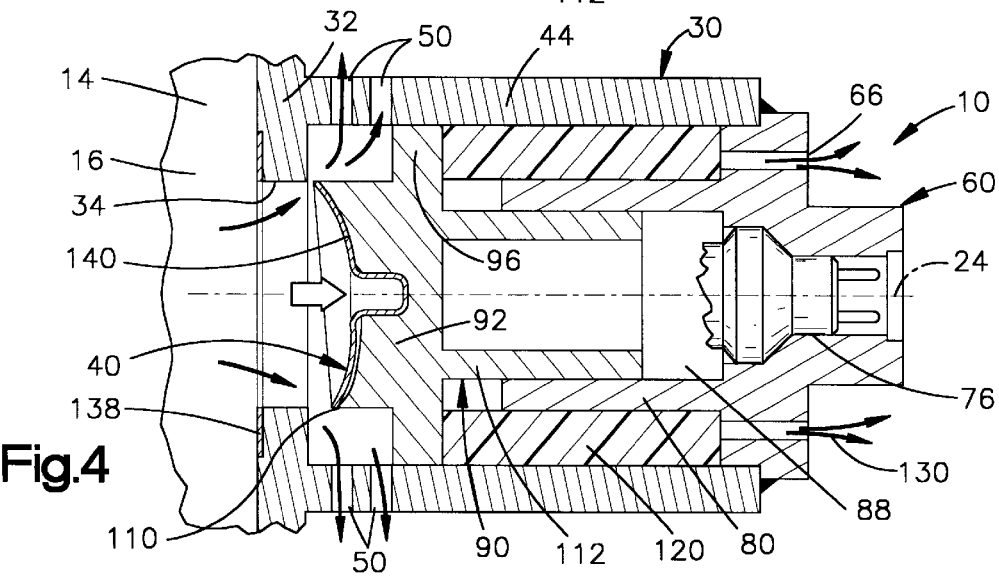
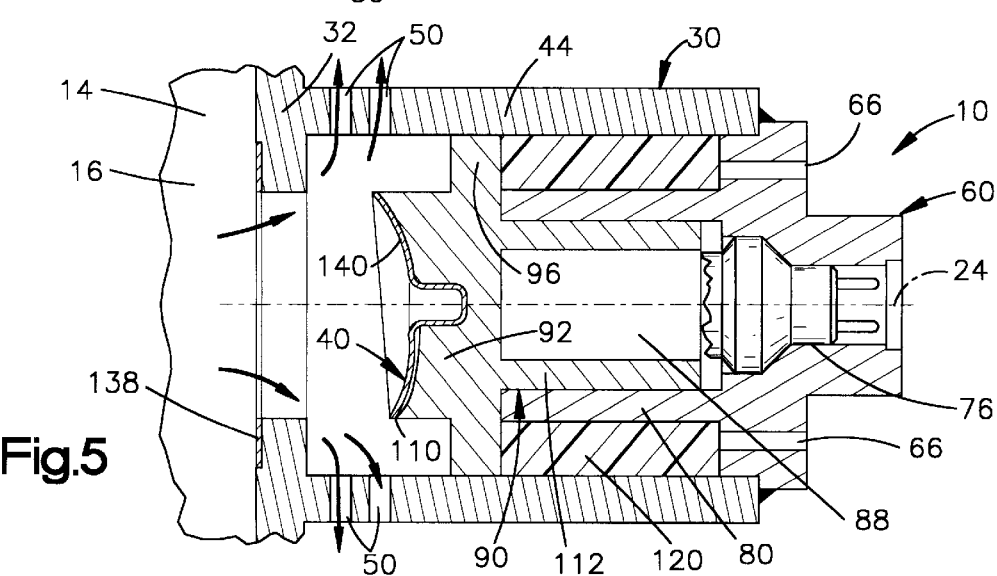

AIR BAG INFLATOR WITH BURST DISK CUTTER AND FLOW CONTROL MEANS

BACKGROUND OF THE INVENTION

1. Technical Field

The present invention relates to an apparatus for inflating an inflatable vehicle occupant protection device. In particular, the present invention relates to an inflator for inflating an air bag to help protect a passenger of a vehicle.

2. Description of the Prior Art

U.S. Pat. No. 5,257,817 describes an air bag inflator having a flow control device. The flow control device includes a ball piston disposed in a cylinder. The ball piston has a surface against which gas under pressure from a chamber acts to move the ball piston in a first direction in the cylinder to allow increased flow of gas through a gas outlet opening. An elastomeric member controls movement of the ball piston in the cylinder.

U.S. Pat. No. 5,195,777 also describes an air bag inflator having a flow control device. The flow control device includes a piston disposed in a cylinder. The piston has a surface against which gas under pressure from a chamber acts to move the ball piston in a first direction in the cylinder to allow increased flow of gas through a gas outlet opening. A crushable honeycomb controls movement of the ball piston in the cylinder.

In the inflators described in U.S. Pat. Nos. 5,257,817 and 5,195,777, a burst disc initially blocks fluid flow from the chamber. The burst disc is opened by an increase in pressure in the chamber. The pressure increase in the chamber is caused by ignition of an ignitable material in the chamber to heat gas in the chamber to increase the pressure in the chamber.

SUMMARY OF THE INVENTION

The present invention is an apparatus for inflating an inflatable vehicle occupant protection device. The apparatus comprises a container defining a chamber containing fluid under pressure. The container has a first opening. A frangible member covers the first opening and blocks fluid flow from the chamber. The apparatus includes means for defining a second opening, spaced apart from the first opening, through which fluid can flow from the first opening to the inflatable device to inflate the inflatable device. The apparatus includes a cutter movable in a first direction for cutting the frangible member to release fluid to flow from the chamber through the first opening to the second opening. The cutter is movable in a second direction opposite the first direction for allowing an increasing flow of fluid through the second opening as the cutter moves in the second direction.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a view similar to FIG. 2 showing the parts of the inflator in a second condition, shortly after actuation of the inflator;

FIG. 4 is a view similar to FIG. 2 showing the parts of the inflator in a further actuated condition;

FIG. 5 is a view similar to FIG. 2 showing the parts of the inflator in a final actuated condition;

DESCRIPTION OF PREFERRED EMBODIMENTS

Figures 1, 2:
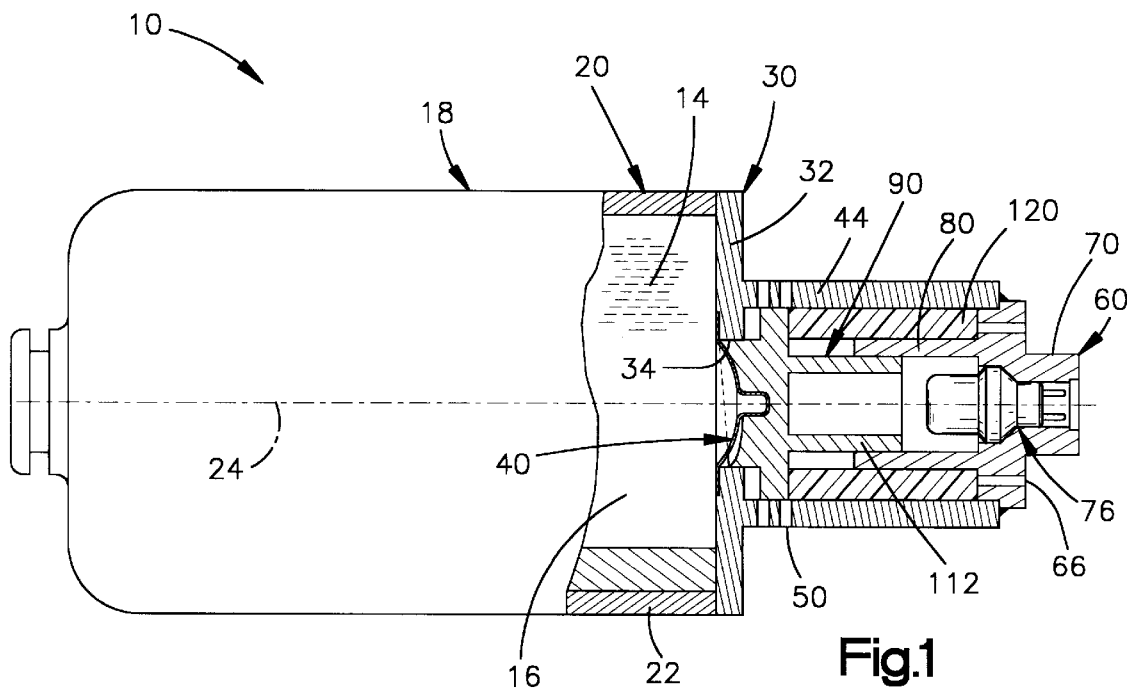
FIG. 1 is a side elevational view, partly in section, of an inflator in accordance with a first embodiment of the present invention.
FIG. 2 is an enlarged view of a portion of the inflator of FIG. 1, showing the parts of the inflator in a first, unactuated, condition.
Figure 6:
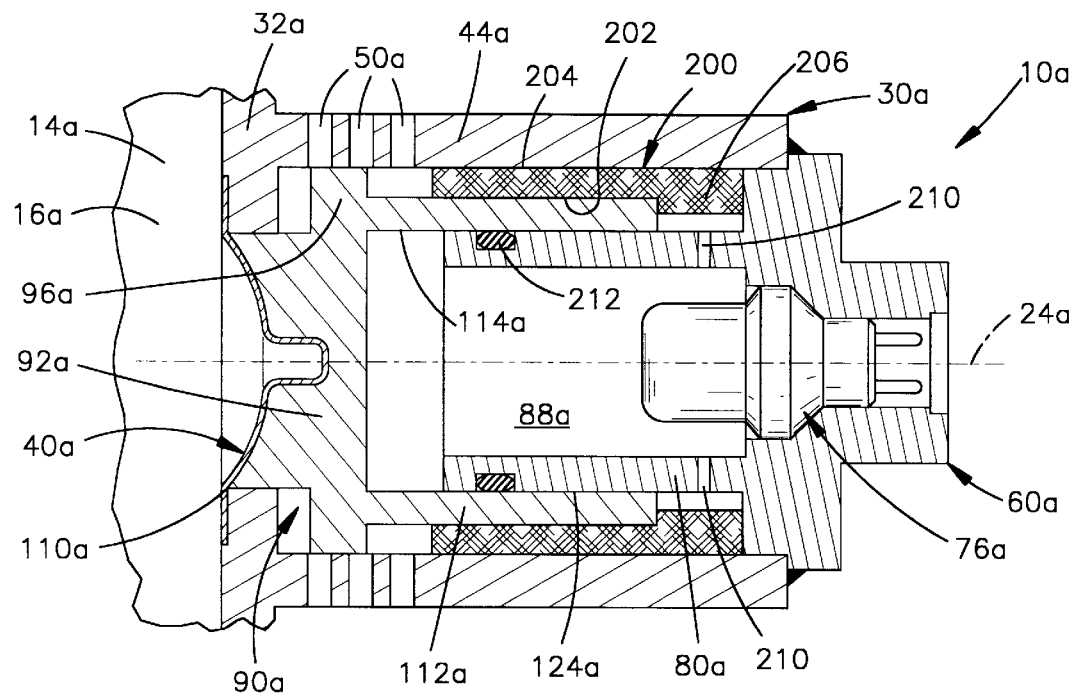
FIG. 6 is a view similar to FIG. 2 of a portion of an inflator in accordance with a second embodiment of the present invention, shown in a first, unactuated, condition.

The present invention relates to an apparatus for inflating an inflatable vehicle occupant protection device and in particular to an inflator for inflating an air bag to help protect a passenger of a vehicle. The present invention is applicable to various inflator constructions. As representative of the present invention, FIG. 1 illustrates an inflator 10 for inflating an air bag (not shown) to help protect a passenger of a vehicle. Other inflatable vehicle occupant protection devices that can be used in accordance with the invention include, for example, inflatable seat belts, inflatable knee bolsters, inflatable head liners or side curtains, and knee bolsters operated by inflatable air bags.

In the inflator 10, a quantity of gas 14 is stored under pressure in a chamber 16 in a container 18. The gas 14 is preferably argon, although other gases such as air or nitrogen could be used. The container 18 includes a main body portion 20 having a cylindrical side wall 22 centered on an axis 24 of the inflator 10.

A diffuser 30 is secured to the main body portion 20 of the container 18. The diffuser 30 has a radially extending end wall 32 which extends across the open end of the main body portion 20 of the container 18. The end wall 32 forms part of the container 18 and has a circular opening 34 centered on the axis 24.

The container 18 includes a burst disc 40, described below in more detail. The burst disc 40 is welded along its circular outer periphery to the end wall 32 of the diffuser 30. The burst disc 40 seals the opening 34 in the end wall 32 of the diffuser 30.

The diffuser 30 has a cylindrical side wall 44 which extends axially outward from the end wall 32. The diffuser side wall 44 has parallel, cylindrical inner and outer side surfaces 46 and 48 (FIG. 2). A series of fluid outlets 50 extend through the side wall 44 near the end wall 32. The fluid outlets 50 extend radially between the inner and outer side surfaces 46 and 48 of the side wall 44 of the diffuser. The fluid outlets 50 direct inflation fluid from the inflator 10 into the air bag, in a manner described below.

An initiator housing 60 is welded to the outer end of the diffuser side wall 44. The initiator housing 60 has a generally disc shaped main body portion 62 with a radially extending, axially inner side surface 64. A plurality of extrusion orifices 66 extend axially through the main body portion 62 of the initiator housing 60. The initiator housing 60, the diffuser 30 and the burst disc 40 together define a cylinder 88 in the inflator 10.

A tubular extension portion 70 of the initiator housing 60 extends axially outward from the main body portion 62. An initiator recess 74 is formed in the main body portion 62 and extension portion 70 of the initiator housing 60. An igniter or initiator 76 is disposed in the initiator recess 74. The initiator 76 is a known, electrically energizable device which, when energized, emits combustion products under pressure.

The initiator housing 60 includes a cutter support 80 which extends axially from the main body portion 62 in a direction toward the burst disc 40 and the container 18. The cutter support 80 has a tubular, cylindrical configuration including parallel inner and outer side surfaces 82 and 84 centered on the axis 24. The outer side surface 84 of the cutter support 80 is spaced radially inward from the inner side surface 46 of the side wall 44 of the diffuser 30. The cutter support 80 has an annular end surface 86 which extends radially between the side surfaces 82 and 84.

A cutter 90 is supported for sliding movement in the cylinder 88, in the manner of a piston. The cutter 90 has a main body portion 92 with a cylindrical outer side surface 94 slidably received in the central opening 34 in the diffuser end wall 32. An annular flange 96 of the cutter 90 projects radially outward from the main body portion 92 of the cutter 90. The flange 96 has parallel, radially extending, axially inner and outer side surfaces 98 and 100.

A concave burst disc recess 102 (FIG. 2) is formed in the main body portion 92 of the cutter 90. A generally spherical major portion of the burst disc 40 is received in the recess 102. An extended portion 104 of the recess 102 receives a projecting portion 106 of the burst disc 40 to block radial movement between the burst disc 40 and the cutter 90.

The outer periphery of the main body portion 92 of the cutter 90 forms a generally circular cutting edge 110 on the cutter. In a preferred embodiment, the cutting edge 110 extends at a small angle to the axis 24 and thus has an elliptical configuration. This results in cutting of the burst disc 40, as described below, initially at one point rather than along the entire cutting edge 110. The angle is exaggerated in the drawings for clarity; the angle in the preferred embodiment is about one and one-half degrees.

An actuator portion 112 of the cutter 90 extends axially from the main body portion 92 in a direction away from the burst disc 40. The actuator portion 112 has a tubular, cylindrical configuration including parallel, axially extending cylindrical inner and outer side surfaces 114 and 116. The outer side surface 116 of the actuator portion 112 of the cutter 90 is in abutting engagement with the inner side surface 82 of the cutter support 80 of the initiator housing 60. The cutter 90 is thus supported for sliding movement on the cutter support 80, as well as on the end wall 32 of the diffuser 30, relative to the burst disc 40.

A cylindrically shaped elastomeric member 120 is disposed in the cylinder 88. The elastomeric member 120 is disposed radially between the diffuser side wall 44 and the cutter support 80. The elastomeric member 120 has a cylindrical, radially outer side surface 122 which is in abutting engagement with the cylindrical inner side surface 46 of the side wall 44 of the diffuser 30. A cylindrical, radially inner side surface 124 of the elastomeric member 120 is in abutting engagement with the cylindrical outer side surface 84 of the cutter support 80.

The elastomeric member 120 has an annular, axially inner end surface 126 which is in abutting engagement with the outer side surface 100 of the annular flange 96 of the cutter 90. An opposite axially outer end surface 128 of the elastomeric member 120 is in abutting engagement with the axially inner side surface 64 of the main body portion 62 of the initiator housing 60.

The elastomeric member 120 is preferably made of Shin-Etsu Silicone X-82-2001 A/B which may be purchased from Shin-Etsu Company in Los Angeles, Calif. The material is purchased in a liquid form, poured into a mold of a desired shape and cured at room temperature to form the elastomeric member. When cured, the elastomeric member 120 may have a consistency somewhat like that of a pencil eraser. The material pulverizes upon the application of force in excess of a predetermined amount. Because the elastomeric member 120 is one piece of solid material, it is easily assembled in the inflator 10.

FIG. 2 illustrates the parts of the inflator 10 in a first condition prior to actuation of the inflator. The burst disc 40 is intact, maintaining the gas 14 within the chamber 16. The pressure of the gas 14 in the chamber 16 forces the burst disc 40 against the cutter 90.

The elastomeric member 120 is disposed between the cutter 90 and the initiator housing 60, and blocks axial movement of the cutter away from the burst disc 40, that is, in a direction toward the right as viewed in FIG. 2. The axially inner side surface 98 of the flange 96 of the cutter 90 is spaced apart axially from the end wall 32 of the diffuser 30. As a result, the cutter 90 has room for movement toward the end wall 32 of the diffuser 30, to enable cutting of the burst disc 40.

Upon sensing of a predetermined vehicle condition such as sudden deceleration, the initiator 76 is electrically energized. The initiator 76 emits combustion products under pressure into the cylinder 88 in the inflator 10.

The force of the combustion products of the initiator 76 causes the cutter 90 to move away from the initiator, in a direction to the left as viewed in FIGS. 2 and 3. The cutting edge 110 on the cutter 90 engages and cuts the burst disc 40 cleanly, without fragmentation. An annular outer portion 138 of the burst disc 40 remains welded to the diffuser end wall 32. A generally circular central portion 140 of the burst disc 40 is severed from the outer portion 138. The flange 96 of the cutter 90 engages the end wall 32 of the diffuser 30 to limit movement of the cutter to the left as viewed in FIG. 3.

When the burst disc 40 is thus cut, the pressure in the container 18 forces the cutter 90 to move back toward the initiator 76, that is, to the right as viewed in FIGS. 3 and 4, from the position shown in FIG. 3 to the positions shown in FIGS. 4 and 5. Gas 14 flows from the chamber 16 in the container 18 through the opening 34 in the end wall 32 of the diffuser 30. The gas 14 flows into the cylinder 88. The severed portion 140 of the burst disc 40 remains pressed in the recess 102 in the main body portion 92 of the cutter 90.

As the cutter 90 moves to the position shown in FIG. 4, the flange 96 of the cutter moves away from the end wall 32 of the diffuser 30 and into contact with the inner end surface 126 of the elastomeric member 120. The moving cutter 90 exerts force on the elastomeric member 120. The force exerted by the moving cutter 90 on the elastomeric member 120 causes the elastomeric member to pulverize. The pulverized material is extruded or forced out of the cylinder 88 through the extrusion orifices 66 in the main body portion 62 of the initiator housing 60, as indicated by the arrows 130 in FIG. 4. The movement of the cutter 90 stops when the cutter flange 96 engages the end surface 86 of the cutter support 80.

The movement of the cutter 90 toward the elastomeric member 120 exposes the gas outlet openings 50. The gas 14 flows radially outwardly through the gas outlet openings 50 in the diffuser 30 and into the air bag (not shown) to inflate the air bag. As the cutter 90 moves from the position shown in FIG. 3 to the positions shown in FIGS. 4 and 5, it exposes an increasing amount of gas exhaust area through the gas outlet openings 50. Thus, the farther along the cutter 90 is in its path of movement in the cylinder 88, the faster the gas 14 can flow out of the container 18 and into the air bag. Accordingly, the rate of gas flow is controlled by the movement and position of the cutter 90 in the cylinder 88. The elastomeric member 120 prevents any flow of combustion products of the igniter 76 into the air bag.

The movement of the cutter 90 is controlled by the amount of resistance offered by the material of the elastomeric member 120. Thus, the size and density, for example, of the elastomeric member 80 can be varied to central the movement of the cutter 90. The surface area of the extrusion orifices 66 can also be varied to control the rate of extrusion of the elastomeric member 120 through the extrusion orifices. This will also control the rate of movement of the cutter 90 and the rate of gas flow into the air bag.

The movement of the cutter 90 is resisted to a small extent by the pressure of the initiator combustion products in the cylinder 88. These combustion products are, however, able to flow out of the cylinder 88 between the outer side surface 116 of the actuator portion 112 of the cutter 90 and the inner side surface 82 of the cutter support 80 of the initiator housing 60. As a result, the pressure of the initiator combustion products in the cylinder 88 offers only a relatively small resistance to movement of the cutter 90.

FIGS. 6–9 illustrate portions of an air bag inflator 10a constructed in accordance with a second embodiment of the present invention. The inflator 10a is generally similar in construction to the inflator 10 (FIGS. 1–5); similar parts are given similar reference numerals with the suffix "a" added for clarity.

In the inflator 10a, the elastomeric member 120 is omitted, and the combustion products of the initiator 76a are vented into the air bag through a filter. The resistance to flow of the combustion products, rather than the elastomeric member, controls the rate of movement of the cutter.

The inflator 10a (FIG. 6) includes a knitted wire mesh filter 200. The filter 200 has a tubular, cylindrical configuration including parallel, axially extending cylindrical inner and outer side surfaces 202 and 204. An axially outer end portion 206 of the filter 200 is radially enlarged as compared to the remainder of the filter. The filter 200 does not extend to, or cover, the gas outlets 50a in the side wall 44a of the diffuser 30a.

The filter 200 is disposed radially inward of the side wall 44a of the diffuser 30a. The actuator portion 112a of the cutter 90a is disposed radially inward of the filter 200 and radially outward of the cutter support 80a. Thus, the radially inner side surface 114a of the actuator portion 112a of the cutter 90a is in sliding engagement with the radially outer side surface 124a of the cutter support portion 80a. The end portion 206 of the filter 200 initially blocks movement of the cutter 90a to the right as viewed in FIGS. 6–9.

A plurality of combustion outlets 210 are formed in the cutter support 80a, near the main body portion 62a of the initiator housing 60a. The combustion outlets 210 enable fluid flow between the interior and the exterior of the tubular cutter support 80a.

An O-ring 212 is disposed in a recess on the outer side surface 84a of the cutter support 80a, near the axially inner end of the cutter support. The O-ring 212 provides a fluid seal between the cutter support 80a and the actuator portion 112a of the cutter 90a.

The initiator 76a, when energized, emits combustion products under pressure into the cylinder 88a in the inflator 10a. The force of the combustion products of the initiator 76a causes the cutter 90a to move away from the initiator and in a direction to cut the burst disc 40a, that is, to the left as viewed in FIGS. 6 and 7. The cutting edge 110a on the cutter 90a engages and cuts the burst disc 40a, in a manner as described above with reference to FIGS. 1–5.

Figure 7:
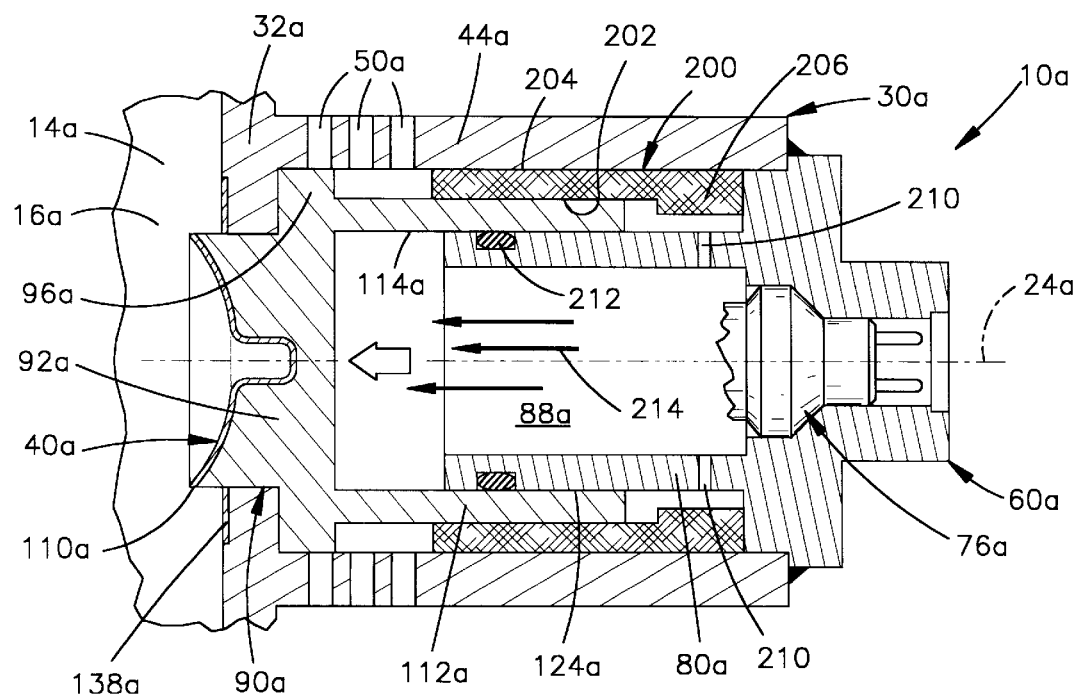
FIG. 7 is a view similar to FIG. 6 showing the parts of the inflator in a second condition, shortly after actuation of the inflator.
Figure 8:
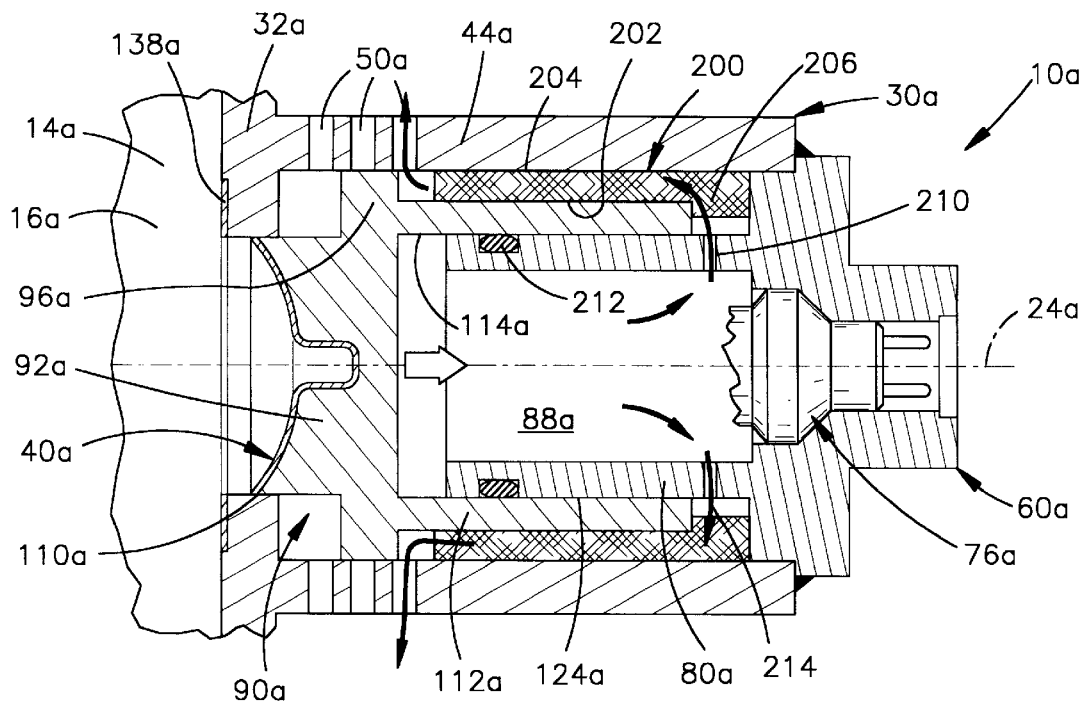
FIG. 8 is a view similar to FIG. 6 showing the parts of the inflator in a further actuated condition.
Figure 9:
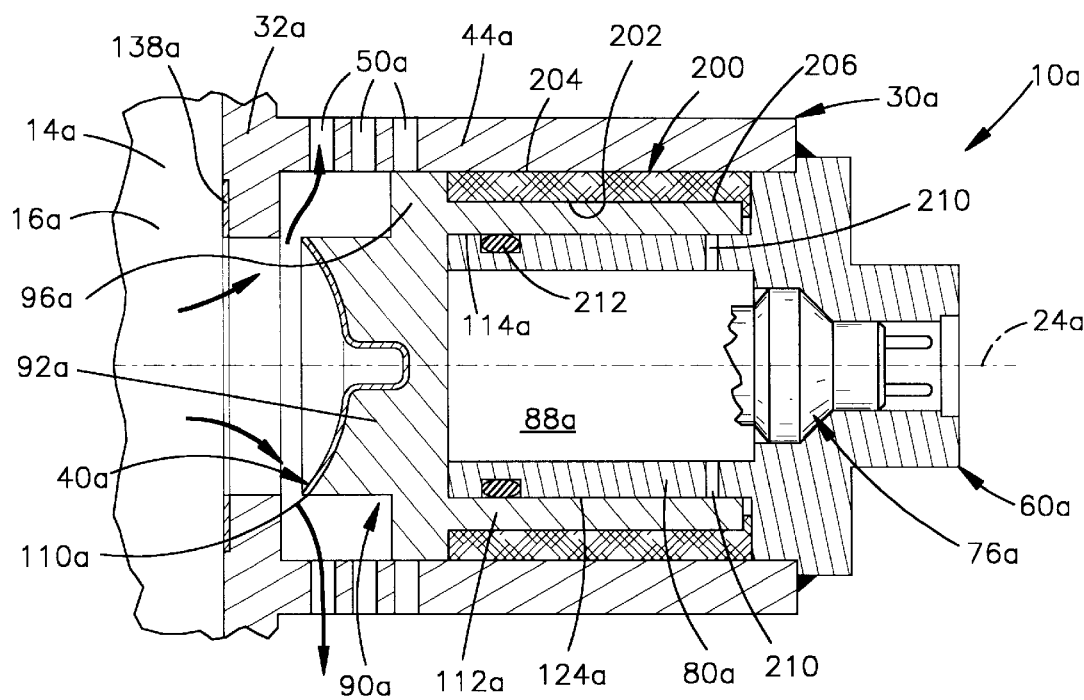
FIG. 9 is a view similar to FIG. 6 showing the parts of the inflator in a final actuated condition.

When the burst disc 40a is cut, the fluid pressure in the chamber 16a forces the cutter 90a to move back toward the initiator 76a, that is, to the right as viewed in FIGS. 7–9, from the position shown in FIG. 7 to the positions shown in FIG. 8 and 9. Gas 14a flows from the chamber 16a into the cylinder 88a.

As the cutter 90a moves to the positions shown in FIGS. 8 and 9, the combustion products of the initiator 76a (indicated by the arrows 214 in FIGS. 7 and 8) are forced out of the interior of the cutter support 80a through the combustion outlets 210. The combustion products 214 flow through the filter 200 and exit the diffuser 30a through the gas outlets 50a. The restrictive flow path of the combustion products 214 through the relatively small combustion outlets 210 causes the combustion products to be compressed in the cylinder 88a and to resist movement of the cutter 90a. The filter 200 prevents any pyrotechnic combustion materials from the igniter 76a from passing into the air bag.

The rate of movement of the cutter 90a is controlled primarily by the flow area of the combustion outlets 210. The flow area of the combustion outlets 210 can be varied to control the rate of flow of the combustion products 214 and, thereby, the rate of movement of the cutter 90a and the rate of gas flow into the air bag. The density of the filter 200, and the flow area of the outlets 50a, can also be varied to control the rate of movement of the cutter 90a and the rate of gas flow into the air bag.

As the cutter 90a moves in the cylinder 88a, it exposes the gas outlet openings 50a. The gas 14a flows radially outwardly through the gas outlet openings 50a in the diffuser 30a and into the air bag (not shown) to inflate the air bag. As the cutter 90a moves from the position shown in FIG. 7 to the positions shown in FIGS. 8 and 9, it exposes an increasing amount of gas exhaust area through the gas outlet openings 50a. Accordingly, the rate of gas flow is controlled by the movement and position of the cutter 90a in the cylinder 88a.

As the cutter 90a moves to increase the gas exhaust area for the inflation fluid 14, the available flow area for exhaust of the initiator combustion products through the outlets 50a decreases. As this occurs, however, the pressure of the initiator combustion in the cylinder 80a decays rapidly. The fluid pressure in the cylinder 88a resists movement of the cutter 90a significantly only during the initial portion of the movement of the cutter away from the chamber 16a. By the time the movement of the cutter 90a has significantly reduced the available exhaust area for the initiator combustion products, such reduction is inconsequential because the pressure in the cylinder 80a is already very low.

In each of the inflators 10 and 10a, the burst disc is opened with a cutter instead of through a pressure increase in the gas storage chamber 16. As a result, these inflators are suitable for use as a "cold gas" type of inflator, that is, an inflator in which there is no ignitable material in the chamber 16 and gas stored at a high pressure is released from the inflator without first being heated to raise its pressure. Another advantageous feature of the inflators 10 and 10a is that cutting the burst disc with the circular cutter minimizes fragmentation of the burst disc. When the burst disc is opened, the severed central portion of the burst disc stays in the concave recess in the cutter because of the pressure of the inflation fluid flowing from the chamber. Additionally, the bi-directional movement of the cutter also eliminates the use of a projectile passing through the burst disc and into the container, as is done with some known inflator designs.

From the above description of the invention, those skilled in the art will perceive improvements, changes and modifications in the invention. For example, the burst disc 40 could be replaced with a frangible or thin-walled portion of the diffuser 30 or of the container main body portion 20. Such improvements, changes and modifications within the skill of the art are intended to be covered by the appended claims.

What is claimed is:

1. An apparatus for inflating an inflatable vehicle occupant protection device, said apparatus comprising:

a container defining a chamber containing fluid under pressure, said container having a first opening;

said container including a frangible portion covering said first opening and blocking fluid flow from said chamber;

means for defining a second opening in said apparatus, spaced apart from said first opening, through which fluid can flow from said first opening to the inflatable device to inflate the inflatable device;

a cutter movable in a first direction for cutting said frangible portion to release fluid to flow from said chamber through said first opening to said second opening, said cutter being movable in a second direction opposite the first direction for allowing an increasing flow of fluid through said second opening as said cutter moves in the second direction; and means for controlling the rate of flow of fluid through said second opening by resisting movement of said cutter in the second direction, means for controlling the rate of flow of fluid through said second opening comprises an elastomeric member engageable by said cutter to resist movement of said cutter in the second direction.

2. An apparatus for inflating an inflatable vehicle occupant protection device, said apparatus comprising:

a container defining a chamber containing fluid under pressure, said container having a first opening;

said container including a frangible portion covering said first opening and blocking fluid flow from said chamber;

means for defining a second opening, spaced apart from said first opening, through which fluid can flow from said first opening to the inflatable device to inflate the inflatable device;

a movable member supported in an initial position adjacent to said frangible portion for movement relative to said frangible portion and relative to said second opening, said movable member at least partially covering said second opening when in said initial position;

actuatable means for moving said movable member from said initial position in a first direction to open said frangible portion to release fluid to flow from said chamber through said first opening to said second opening;

said movable member being movable in a second direction opposite said first direction, under the pressure of fluid from said chamber, to allow an increasing flow of fluid through said second opening as said member moves in the second direction; and means for controlling the rate of flow of fluid through said second opening by resisting movement of said movable member in the second direction;

said means for controlling the rate of flow of fluid through said second opening comprises an elastomeric member engageable by said movable member to resist movement of said movable member in the second direction.

3. An apparatus as set forth in claim 2 wherein said elastomeric member is made from a material which pulverizes upon the application of force to said solid body in excess of a predetermined amount.

4. An apparatus as set forth in claim 2 comprising at least one extrusion orifice and wherein said elastomeric member is extruded through said at least one extrusion orifice to resist movement of said movable member in the second direction.

5. An apparatus for inflating an inflatable vehicle occupant protection device, said apparatus comprising:

a container defining a chamber containing fluid under pressure, said container having a first opening;

said container including a frangible portion covering said first opening and blocking fluid flow from said chamber;

means for defining a second opening, spaced apart from said first opening, through which fluid can flow from said first opening to the inflatable device to inflate the inflatable device;

a movable member supported in an initial position adjacent to said frangible portion for movement relative to said frangible portion and relative to said second opening, said movable member at least partially covering said second opening when in said initial position;

actuatable means for moving said movable member from said initial position in a first direction to open said frangible portion to release fluid to flow from said chamber through said first opening to said second opening;

said movable member being movable in a second direction opposite said first direction, under the pressure of fluid from said chamber, to allow an increasing flow of fluid through said second opening as said member moves in the second direction; and means for controlling the rate of flow of fluid through said second opening by resisting movement of said movable member in the second direction;

said movable member is a cutter movable in the first direction for cutting said frangible portion to release fluid to flow from said chamber through said first opening to said second opening;

said frangible portion of said container comprises a member having a first portion welded to said container and a second portion received in a recess in said cutter prior to movement of said cutter in said first direction, said first portion of said member remaining fixed to said container after cutting of said frangible portion, said second portion of said member remaining in said recess in said cutter after cutting of said frangible portion.

* * * * *